US007302309B2

(12) United States Patent
Scott et al.

(10) Patent No.: US 7,302,309 B2
(45) Date of Patent: Nov. 27, 2007

(54) LASER MICROMACHINING METHODS AND SYSTEMS

(75) Inventors: Graeme Scott, Maynooth (IE); John Doran, Raheny Dublin (IE); Rory Jordan, Dalkey Dublin (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 10/832,034

(22) Filed: Apr. 26, 2004

(65) Prior Publication Data

US 2005/0240299 A1 Oct. 27, 2005

(51) Int. Cl.
*G06F 19/00* (2006.01)

(52) U.S. Cl. ...................... 700/166; 700/159; 264/400; 219/121.6; 219/121.7

(58) Field of Classification Search ................ 700/166, 700/159; 264/400; 219/121.76, 121.6, 121.7, 219/121.65

See application file for complete search history.

(56) References Cited

U.S. PATENT DOCUMENTS

| | | | | |
|---|---|---|---|---|
| 4,555,610 | A * | 11/1985 | Polad et al. | 219/121.61 |
| 4,737,613 | A * | 4/1988 | Frye | 219/121.72 |
| 6,037,103 | A * | 3/2000 | Hino | 430/311 |
| 6,407,363 | B2 * | 6/2002 | Dunsky et al. | 219/121.71 |
| 6,423,934 | B2 | 7/2002 | Hasegawa et al. | |
| 6,448,534 | B1 * | 9/2002 | Kobsa | 219/121.72 |
| 6,512,198 | B2 * | 1/2003 | Eisele et al. | 219/121.71 |
| 6,610,960 | B2 | 8/2003 | De Steur et al. | |
| 6,676,878 | B2 * | 1/2004 | O'Brien et al. | 264/400 |
| 6,689,985 | B2 * | 2/2004 | Lipman et al. | 219/121.7 |
| 2002/0149136 | A1 * | 10/2002 | Baird et al. | 264/400 |
| 2002/0170891 | A1 * | 11/2002 | Boyle et al. | 219/121.67 |
| 2003/0213787 | A1 | 11/2003 | Dunsky et al. | |
| 2004/0017428 | A1 | 1/2004 | Cronin et al. | |
| 2005/0189331 | A1 * | 9/2005 | Millard et al. | 219/121.84 |

FOREIGN PATENT DOCUMENTS

| | | |
|---|---|---|
| EP | 1187698 | 3/2004 |
| WO | WO 03/070415 | 8/2003 |
| WO | WO 03/079669 | 9/2003 |

* cited by examiner

*Primary Examiner*—Alexander Kosowski

(57) ABSTRACT

A method of laser machining a fluid path is provided. The method comprises directing a first laser toward a first surface, directing a second laser toward a second surface of the substrate, and directing a third laser toward the second surface along at least a portion of an edge of an area that defines a portion of the fluid path on the second surface.

10 Claims, 10 Drawing Sheets

LASER MICROMACHINING METHODS AND SYSTEMS

BACKGROUND

The market for electronic devices continually demands increased performance at decreased costs. In order to meet these requirements the components which comprise various electronic devices may be made more efficiently and to closer tolerances.

Laser micromachining is a common production method for controlled, selective removal of material. However, a desire exists to enhance laser machining performance, including, for example, reducing the likelihood of debris formation as a result of the laser micromachining process.

BRIEF DESCRIPTION OF THE DRAWINGS

Features of the invention will readily be appreciated by persons skilled in the art from the following detailed description of exemplary embodiments thereof, as illustrated in the accompanying drawings, in which.

DETAILED DESCRIPTION OF THE PREFERRED EMBODIMENTS

The embodiments described below pertain to methods and systems for laser micromachining a substrate. Laser micromachining is a production method for controlled, selective removal of substrate material. By removing substrate material, laser micromachining can form a feature, having desired dimensions, into the substrate. Such features can be either through features, such as a slot, which pass through a substrate's thickness or at least two surfaces of the substrate, or blind features, such as a trench, which pass through a portion of the substrate's thickness or one surface of the substrate.

Laser machining removes substrate material at one or more laser interaction zone(s) to form a feature into a substrate. Some embodiments can supply liquid or gas to the laser interaction zone along one or more supply paths to increase the substrate removal rate and/or decrease the incidence of redeposition of substrate material proximate the feature.

Examples of laser machining features will be described generally in the context of forming ink feed slots ("slots") in a substrate. Such slotted substrates can be incorporated into ink jet print cartridges or pens, and/or various micro electro mechanical systems (MEMS) devices, among other uses. The various components described below may not be illustrated accurately as far as their size is concerned. Rather, the included figures are intended as diagrammatic representations to illustrate to the reader various inventive principles that are described herein.

Examples of particular feature size, shape, and arrangement are depicted herein. However, any type of feature size and geometry may be fabricated using the inventive methods and apparatuses described herein.

Figure 1:
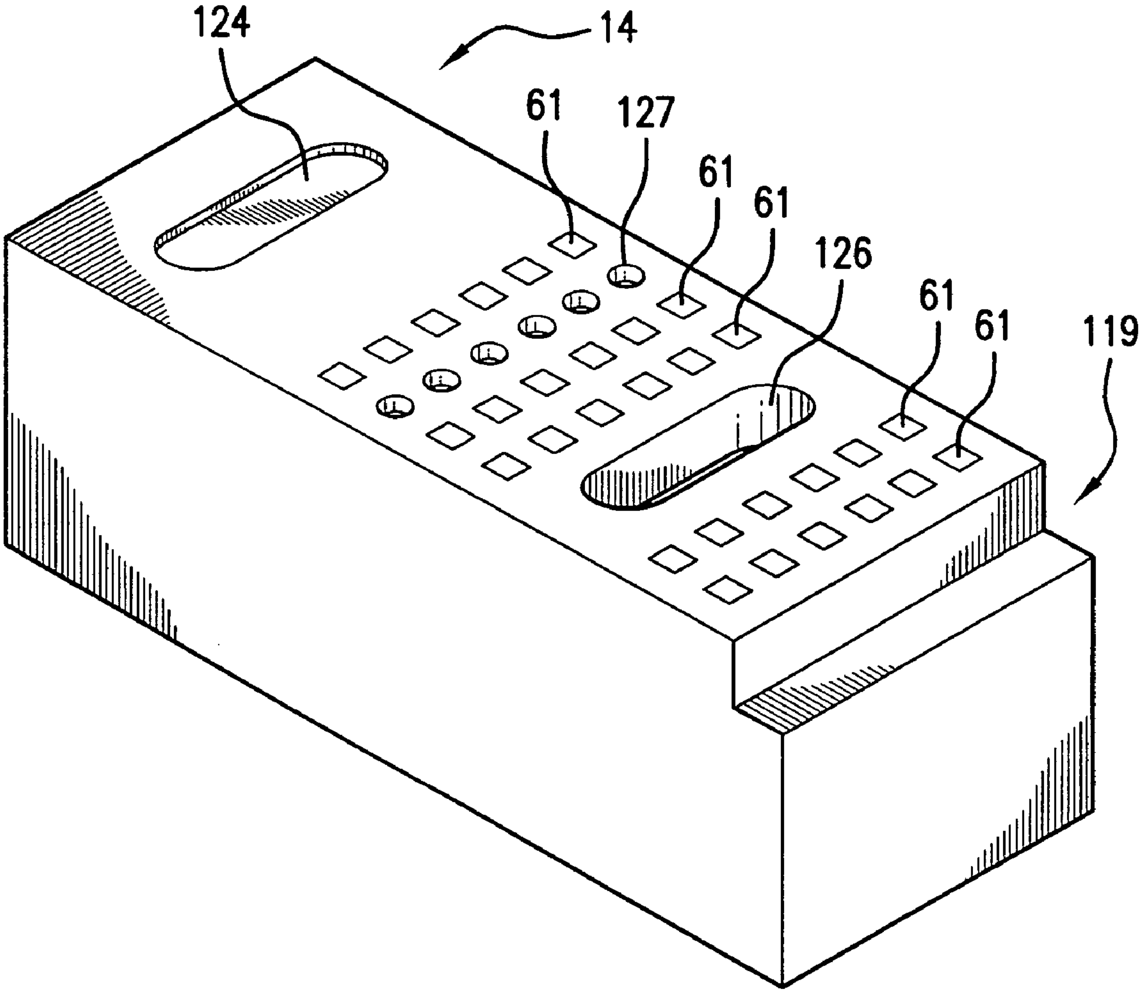
FIG. 1 illustrates a perspective view of one embodiment of a printhead.

FIG. 1 illustrates an enlarged view of one embodiment of the printhead 14 in perspective view. The printhead 14 in this embodiment has multiple features, including an edge step 119 for an edge fluid feed to resistors (or fluid ejectors) 61. The printhead may also have a trench 124 that is partially formed into the substrate surface. A slot (or channel) 126 to feed fluid to resistors 61, and/or a series of holes 127 feeding fluid to resistors 61 are also shown on this printhead, each being formed by a UV laser machining process as described herein. In one embodiment there may be at least two of the features described on the printhead 14 in FIG. 1. For example, only the feed holes 127 and the slot 126 are formed in the printhead 14, where in an alternative embodiment the edge step 119 and/or the trench 124 are formed as well. In another example, the edge step 120, and the slot 126 are formed in the printhead 14, where in an alternative embodiment the trench 124 and/or the feedholes 127 are formed as well.

Figure 2:
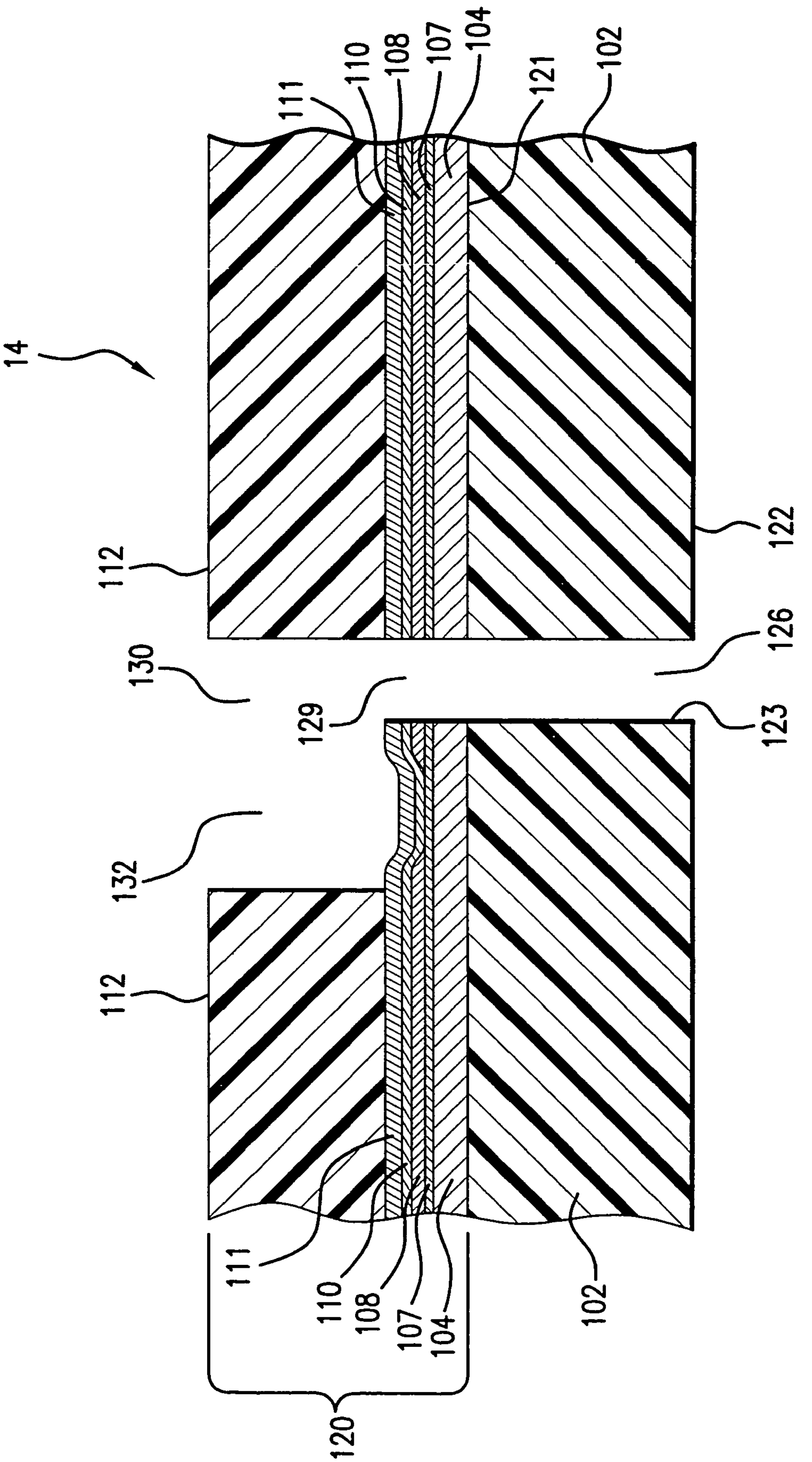
FIG. 2 illustrates a cross-sectional view of an embodiment of the printhead of FIG. 1.

FIG. 2 illustrates a cross-sectional view of the printhead 14 of FIG. 1 where the slot 126 having slot (or side) walls 123 is formed through a substrate 102. The formation of the slot through a slot region (or slot area) in the substrate is described in more detail below. In another embodiment, multiple slots are formed in a given die. For example, the inter slot spacing or spacing between adjacent slots in the die or substrate are as low as 10 microns. (In an embodiment, 10 microns is just over twice the extent of a heat affected zone for each slot, where the heat affected zone is the area along the slot walls that is affected by the laser machining described in this application.)

In FIG. 2, thin film layers (or active layers, a thin film stack, electrically conductive layers, or layers with microelectronics) 120 are formed, e.g. deposited, on a front or first side (or surface) 121 of the substrate 102. The first side 121 of the substrate is opposite a second side (or surface) 122 of the substrate 102. The thin film stack 120 includes at least one layer formed on the substrate, and, in a particular embodiment, masks at least a portion of the first side 121 of the substrate 102. Alternatively or additionally, the layer 120 electrically insulates at least a portion of the first side 121 of the substrate 102.

As shown in the embodiment of the printhead shown in FIG. 2, the thin film stack 120 includes a capping layer 104, a resistive layer 107, a conductive layer 108, a passivation layer 110, a cavitation barrier layer 111, and a barrier layer 112, each formed or deposited over the first side 121 of the substrate 102 and/or the previous layer(s). In one embodiment, the substrate 102 is silicon. In various embodiments, the substrate may be one of the following: single crystalline silicon, polycrystalline silicon, gallium arsenide, glass, silica, ceramics, or a semiconductor material. The various materials listed as possible substrate materials are not necessarily interchangeable and are selected depending upon the application for which they are to be used. In this embodiment, the thin film layers are patterned and etched, as appropriate, to form the resistors 61 in the resistive layer, conductive traces of the conductive layer, and a firing chamber 130 at least in part defined by the barrier layer. In a particular embodiment, the barrier layer 112 defines the firing chamber 130 where fluid is heated by the corresponding resistor and defines a nozzle orifice 132 through which the heated fluid is ejected. In another embodiment, an orifice layer (not shown) having the orifices 132 is applied over the barrier layer 112. Other structures and layouts of layers and components may be utilized as is know in the art.

In the embodiment shown in FIG. 2, a channel 129 is formed through the layers (120) formed upon the substrate. The channel 129 fluidically couples the firing chamber 130 and the slot 126, such that fluid flows through the slot 126 and into the firing chamber 130 via channel 129. In the particular embodiment shown, the channel entrance 129 for the fluid is not in the center of the slot 126. However, the slotted substrate is formed as described herein substantially the same whether the entrance 129 is centrally located or off-center.

Figure 3:
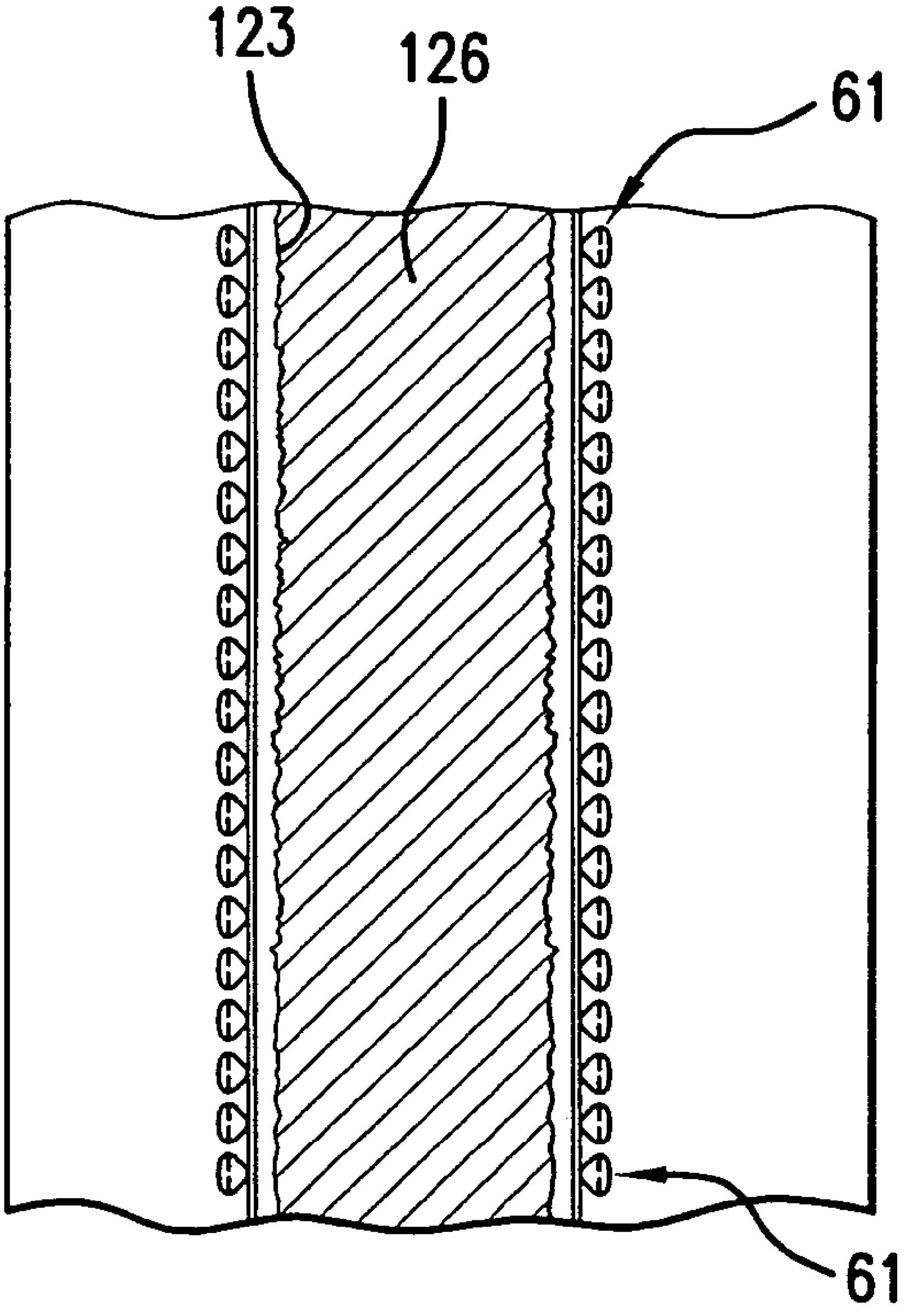
FIG. 3 illustrates a perspective view of the printhead of FIG. 1.
Figure 4:
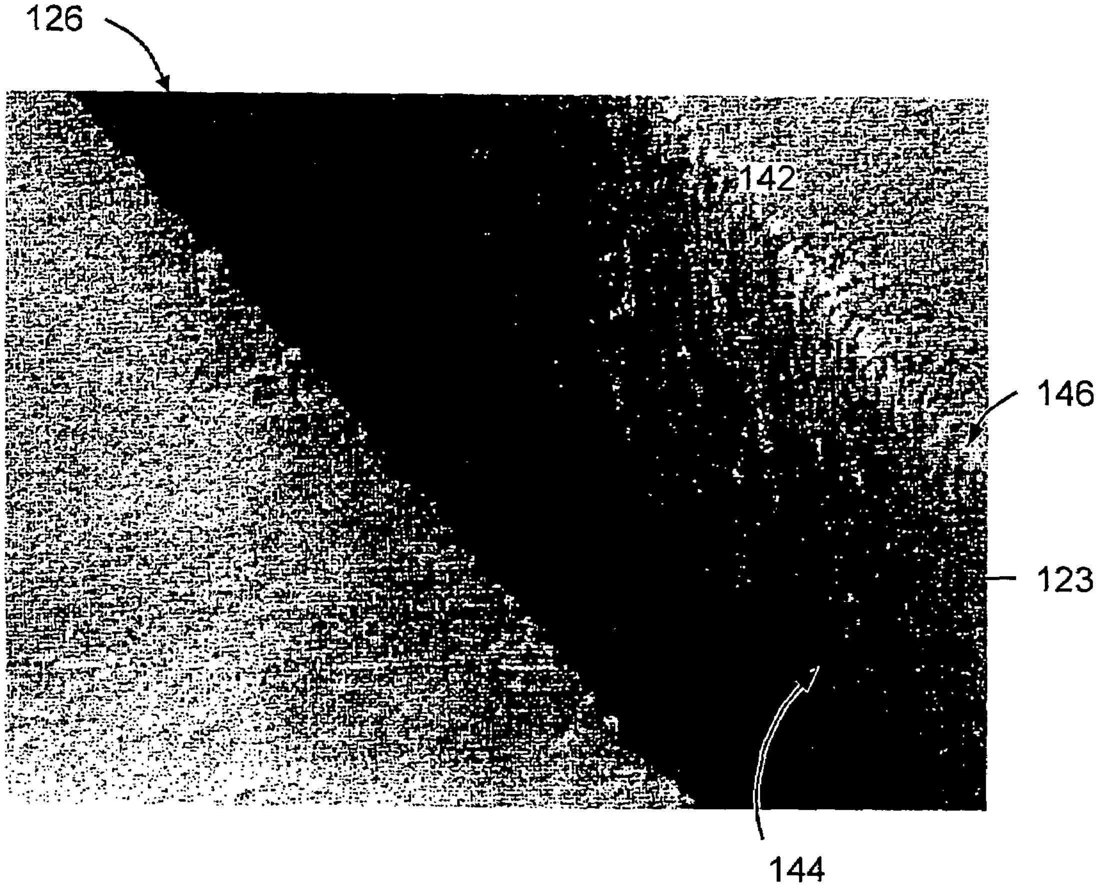
FIG. 4 illustrates a plan view of a feature according to one embodiment.

In the embodiment illustrated in FIG. 3 a perspective view of the printhead 14 and its slot 126 is shown without the barrier layer 112. As shown in the embodiment of FIG. 3, the resistors 61 are along the slot 126. As shown in the embodiment of FIG. 4, the slot wall 123 has a rough area (or breakthrough area) 144 near the middle of the slot 126 formed by the slotting process of the present invention. The rough area 144 is formed by a breakthrough near the middle of the slot 126. The bending moment is minimized at this mid-slot location compared with a slot surface location, and therefore there is less stress on the breakthrough-rough area 144 during processing. As a result, cracking is minimized at the breakthrough-rough area 144, and thus throughout the substrate 102.

Also as shown in FIG. 4, the slot 126 has a wall edge 146. In one embodiment, the roughness (or smoothness) of the wall edge 146 along the front side 121 of the substrate is about 3 microns, and about 5 microns along the second side 122 of the substrate, although in the embodiment the roughness could be more or less.

Figure 5A:
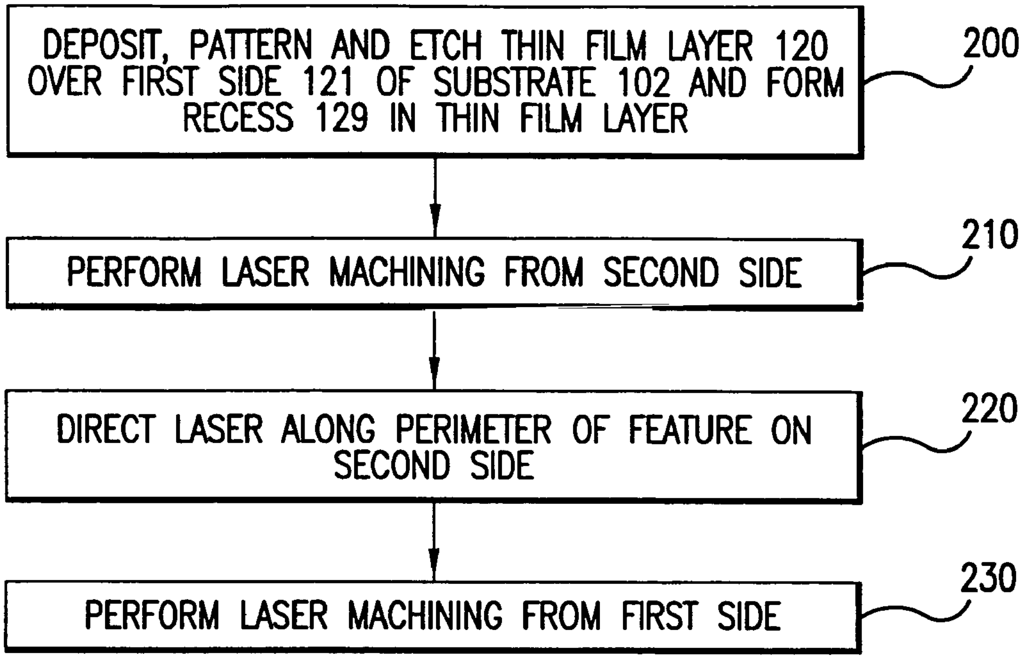
FIGS. 5A and 5B illustrate process flow charts for several embodiments of the manufacturing process for forming a feature for a substrate.

In the embodiment described in the flow chart of FIG. 5A at step 200, the thin film layer or stack 120 is formed, masked and patterned over the first side 121 of the wafer or substrate 102 to form the recess 129, as shown in FIG. 2. In one embodiment (not shown), a hard mask and/or a photoimagable material layer are additionally formed on the backside 122 of the substrate opposite the thin film layer 120. At step 210, the slot formation is begun using a UV laser 408 (FIG. 9) directed to an area of the substrate to have a slot formed therein. In this embodiment, an area on the second side 122 of the substrate is the initial area to be exposed to the UV laser beam. The substrate material in the area of the substrate that is exposed to the UV laser beam is ablated and/or vaporized to form the slot 126, as described in more detail below.

Figure 7A:
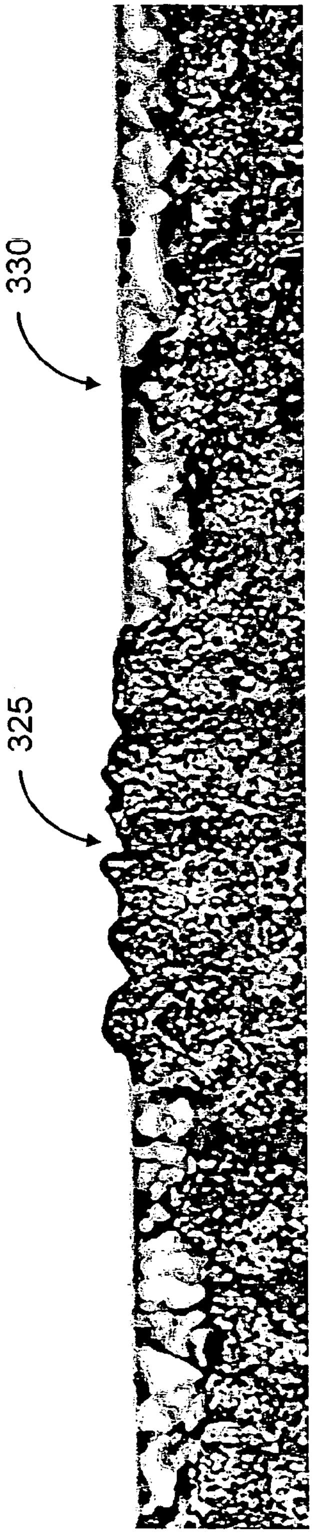
FIGS. 7A and 7B illustrate perspective top and side views of a surface of a substrate with a feature formed therein that does not utilize improved laser micromachining techniques.
Figure 7B:
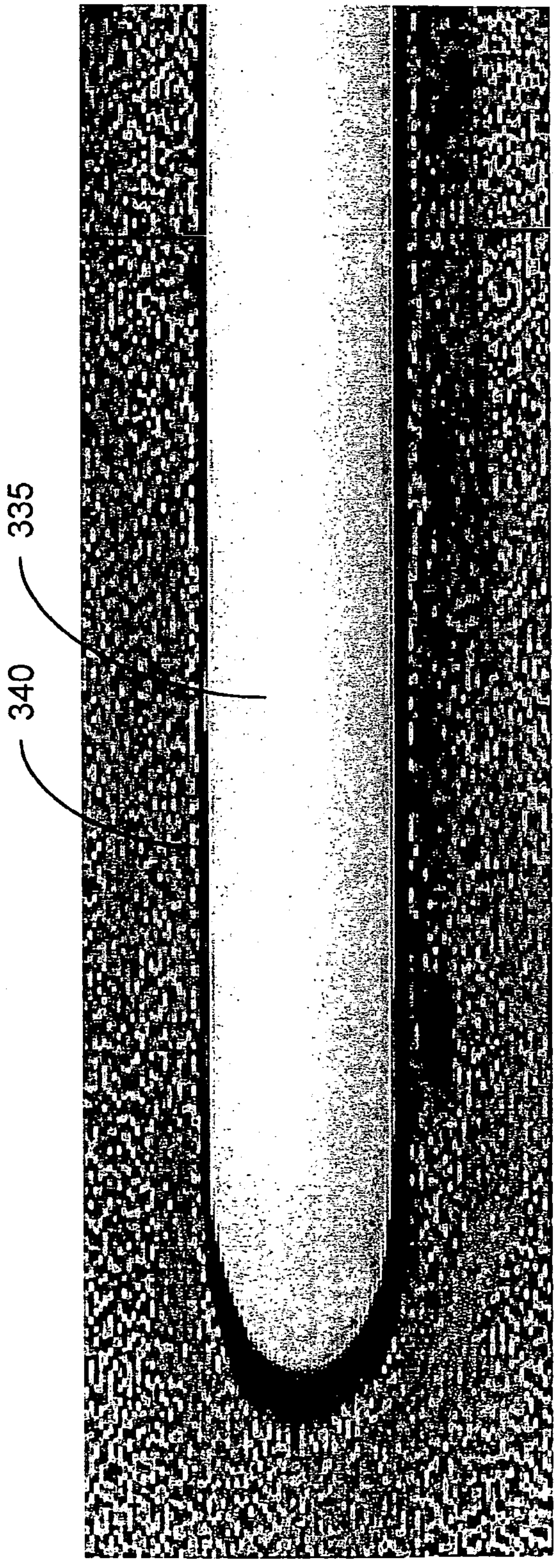

Debris or residue from the laser machining begins to form along the slot walls 123 as well as along the bottom of the trench being formed in the substrate. In alternative embodiments, the debris may be formed of polycrystalline and/or amorphous silicon oxide. As shown in the embodiment of FIGS. 7A and 7B, at the end of step 210, the substrate 102 is laser machined to a depth x. Some of this debris can be removed in standard wafer wash processes, but some types of debris remain loosely attached to the slot edge and may chip off downstream when the wafer is subjected to the elevated temperatures and pressures used during printhead production. Debris of the wrong dimensions can then become trapped in the printhead architecture and block the fluid flow paths causing low manufacturing yields.

At step 220, a source of energy is directed along a least of portion of the perimeter of the feature, e.g. trench or slot, being formed on the surface. Directing the laser beam along at least a portion of the feature, is preferably performed at an energy that is less than the energy that is used by the UV laser 408 to have a slot formed in step 210. The directing on the energy source, which may be the same source that directs UV laser 408 to form the feature.

Figure 8A:
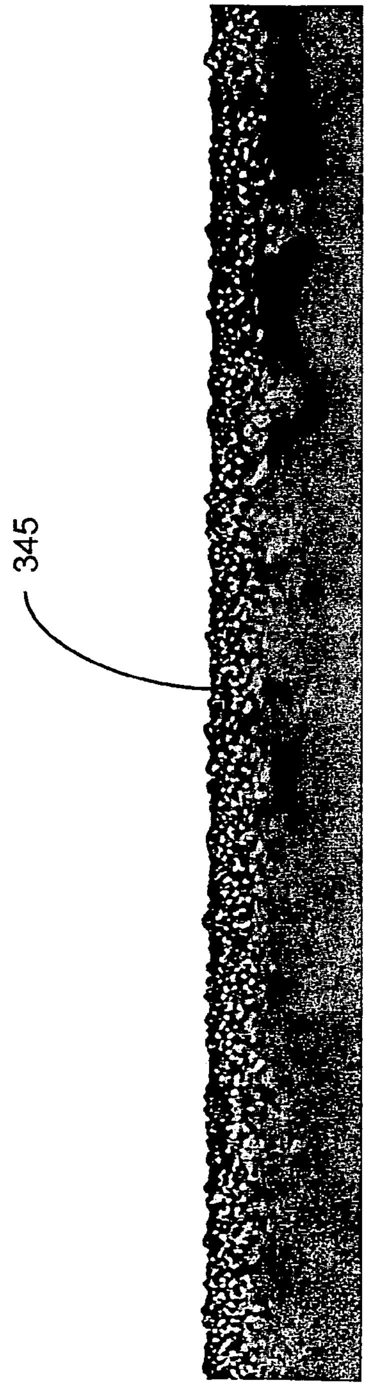
FIGS. 8A and 8B illustrate perspective top and side views of a surface of a substrate with a feature formed therein that utilize an embodiment of improved laser micromachining techniques.

By directing a laser at a lower energy level along the perimeter, the edges of the feature may be remelted so that debris or other protrusions are reduced in size, as can be seen in FIGS. 7A and 8A. If the laser energy used for step 210 is maintained for step 220 the edges of the feature can be ablated off, but this higher energy may generate some secondary debris.

At step 230, the laser beam 140 is directed towards the first side or surface 121 of the substrate through the recess in the thin film stack 120. The slot is completed by UV laser machining through the substrate to the depth y, where depth x is greater than depth y, where x+y=substrate depth. In a first embodiment, y is about 20 microns. In a second embodiment, x is about twice y. In a third embodiment, x is about the same as y. In yet another embodiment, y is greater than x.

Steps 210, 220, and 230 may be repeated for each slot 126 in the die (or substrate). In the embodiment shown and described with regard to FIGS. 5A and 5B, throughput is improved with the described bi-directional process because the debris (or redeposited material) escapes the machined channel more readily in shallower rather than deeper trenches. Further, in embodiments where x is greater than y, the majority of the debris that escapes the machined channels escapes from the backside 122, thereby limiting the amount of contamination to the active layer(s) 120 on the front side 121 of the substrate. In another method, the UV laser etch is performed first from the first side 121, and then from the second side 122 to meet at the breakthrough area 144. In this embodiment, the laser machining is provided by a UV laser beam 408 (FIG. 9), and in one particular embodiment, is provided by a diode-pumped solid-state pulsed UV laser. In another particular embodiment, the UV laser 408 originates from a Xise 200 Laser Machining Tool, manufactured by Xsil of Dublin, Ireland. A laser source 408 uses power in the range of about 2 to 100 Watts, and more particularly about 7 Watts. The laser beam has a wavelength of (1060 nm)/n or (1053 nm)/n, where n=2, 3 or 4. In a specific embodiment, the UV wavelength is less than about 400 nm, in particular about 355 nm. The pulse width of the laser beam is about 20 ns in this embodiment, and the repetition rate is about 55 kHz. The laser beam has a diameter of about 5 to 100 microns, and more particularly about 30 microns in this embodiment. In an embodiment that is not shown here, the laser-machining tool of the present invention has a debris extraction system to remove the debris resulting from the laser machining.

In an embodiment, the intense. UV light is absorbed into less than about 1 micron of the surface of the material being ablated. Because the light energy is so concentrated near the surface of the material, the material rapidly heats, melts, and vaporizes. A mixture of vapor and molten droplets are then quickly ejected away. Consequently, the surrounding region (or heat affected zone) is not melted substantially or otherwise substantially damaged because the process happens so quickly, and there is not enough time for significant heat to propagate to the surrounding regions. A more in depth explanation of the process is described on pps. 131–134 of Laser-Beam Interactions with Materials: Physical Principles and Applications, 2nd updated edition, 1995, written by Martin von Allmen & Andreas Blatter. In the laser machining process of the present embodiments, smoother and more precise slot profiles are attainable because the laser machining is so localized. Accordingly, slots formed by the embodiments described herein again have surface roughness of at most 5 microns. However, when the laser machine breaks through the substrate, and the slot 126 is formed, there is likely to be the rough area or rough spot 144 near the breakthrough point. In these embodiments, the rough area 144 near the center of the slot is redeposited material caused by heated fragments that were not efficiently extracted due to the depth of the trench. These fragments subsequently melted and resolidified to form the debris.

It should be noted that while step 220 is shown as occurring before step 230, the order of these steps may be reversed, depending on the algorithm that is utilized laser machine 402 (FIG. 9) that is used to form the feature.

Figure 5B:
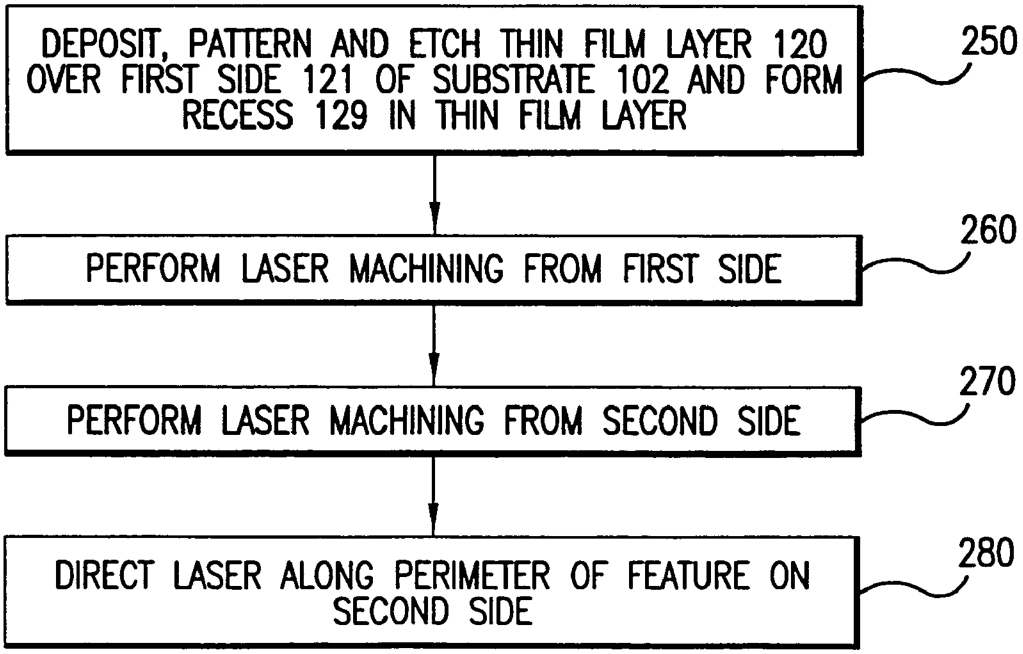

As depicted in FIG. 5B, steps 250, 260, and 270 are similar to steps 200, 210, and 220 with some differences as follows. After step 270 is performed, the laser machining from the second side breaks all the way through to the first surface of the substrate. Steps 260, 270 and 280 can be repeated for each slot 126 to be formed in the die. In an alternative embodiment that is not shown, the barrier layer 112 is formed with the thin film stack 120 over the first side 121 of the substrate in step 250. In another alternative embodiment, step 270 is performed after step 260 is completed. In another alternative embodiment, the UV laser machining of the slot is fully performed from the first side 121 of the substrate.

Directing the laser beam at the perimeter as discussed with respect to steps 220 and 260 is implemented through a simple change or addition to a software program or programs that are used to perform steps 210, 230, 250, and 270. Such changes can include, for example, controlling the speed, trajectory, spot size, or intensity of the laser. In operation, step 220 or 260 may occupy less than five percent of the total time required create a feature. Since the same laser may be utilized, no extra equipment is required.

It should be noted that while FIGS. 5A and 5B, discuss that a source of energy is directed along a least of portion of the perimeter of the feature on a second side, the source of energy may be directed along the perimeter of the feature of the first side in addition to the second side. To perform this additional step, all the would be needed are instructions to the laser machine 402 (FIG. 9) to perform this additional step.

Figure 6:
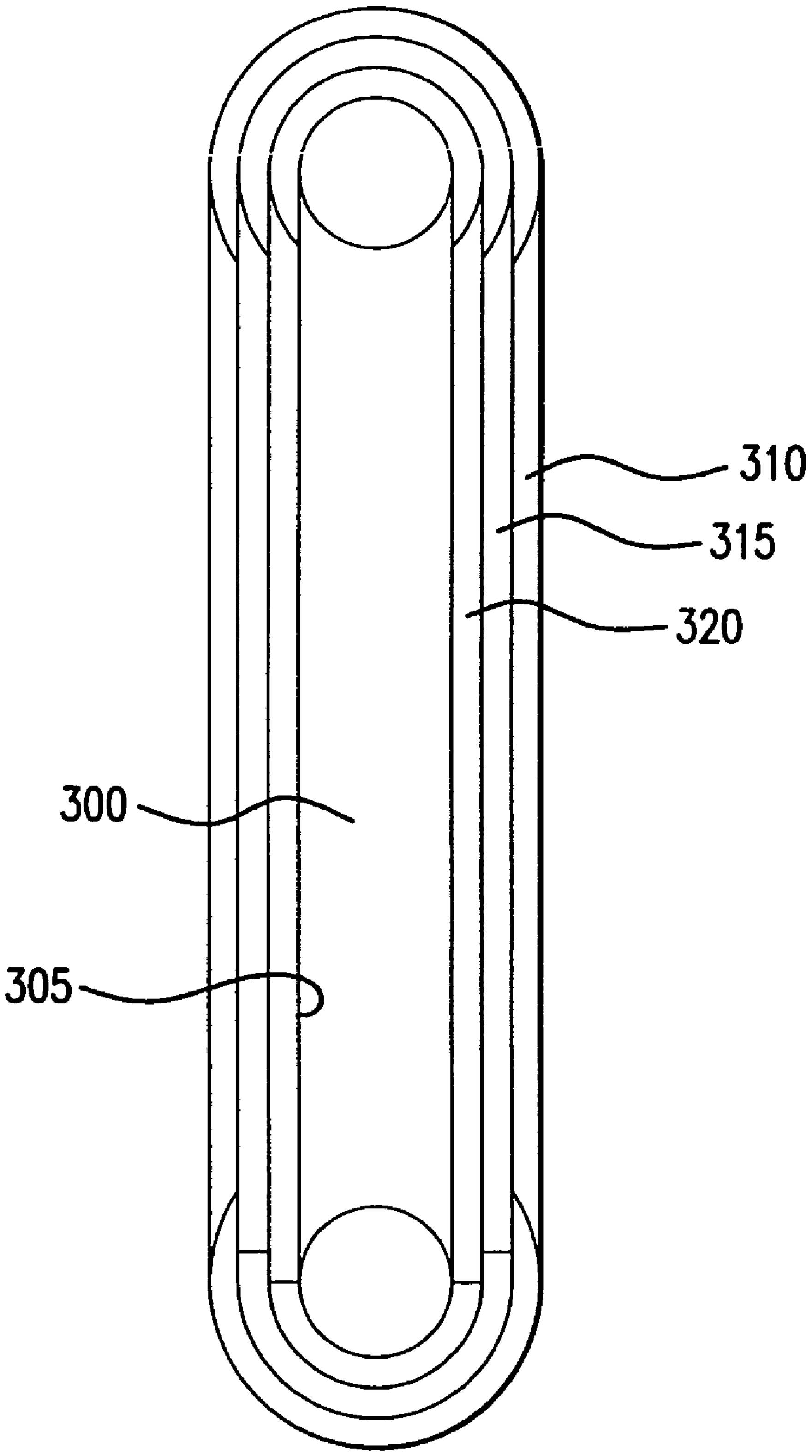
FIG. 6 illustrates a plan view of patterns for laser micromaching to improve feature characteristics according one embodiment.

Referring to FIG. 6, a plan view of patterns for laser micromaching to improve feature characteristics according one embodiment is illustrated. Feature 300, which is depicted here as a slot, has an edge 305 that defines a perimeter of feature 305. In some embodiments, edge 305 is formed by two surfaces that are substantially normal to each other. In the formation of the edge by a laser, e.g. as described with respect to step 210, debris or other protrusions (FIGS. 7A and 7B) are formed at or near edge 305. The debris needs to be removed so that it does not block or impede the flow of fluids in slots or other feature types. The protrusions are more problematic, as they cannot be removed by normal wash processes and while not an immediate problem, they may chip off in the future when the wafer is subjected to the elevated temperatures and pressures used during printhead production when the substrate with the feature is already incorporated into a partially completed device.

Directing the laser, as described with respect to FIGS. 5A and 5B, can be done along several paths that are along all, or some, of the perimeter of the feature 300. The paths, e.g. paths 310, 315, and 320. Each of the paths has a width, which is defined by the spot size of the laser and a distance from edge 305. In this embodiment, a distance from edge 305 for path 310 is 10 microns, for path 315 is 20 microns, and for path 320 is 30 microns. It should be noted that another path may be exactly along edge 305, which utilizes a smaller spot size then paths 310, 315, and 320.

Each of the paths 310, 315, and 320 can provides remelting or ablation of the substrate along the edge 305 of the feature. As such, each may be utilized to remove debris and protrusions formed along or substantially along the edge 305 of feature 300. The preferred distance of the additional path from the edge 305 for a 30 micron diameter laser beam is that shown by 320 (i.e. 20 microns). The preferred offset of the additional path from 305 is between 50% and 70% of the diameter of the laser beam cutting the additional path, and in any case should not exceed the diameter of the beam or it will generate a separate feature, concentric with the edge 305, without removing debris and protrusions.

Referring to FIGS. 7A and 7B, perspective top and side views of a surface of a substrate with a feature formed therein that does not utilize improved laser micromachining techniques as described with respect to FIG. 5A, 5B, or 6 are illustrated. It can be seen, from areas 325–330, that there several protrusions that may break off and occlude slot 335. Further, in FIG. 7B the edge 340 is formed by surfaces that are substantially orthogonal to each other. This arrangement also makes it easier to chip or break off portions when an object scrapes the edge. Further, the having such an edge may make erosion of pieces of the edge more likely if reactive fluids, such as ink are utilized.

Figure 8B:
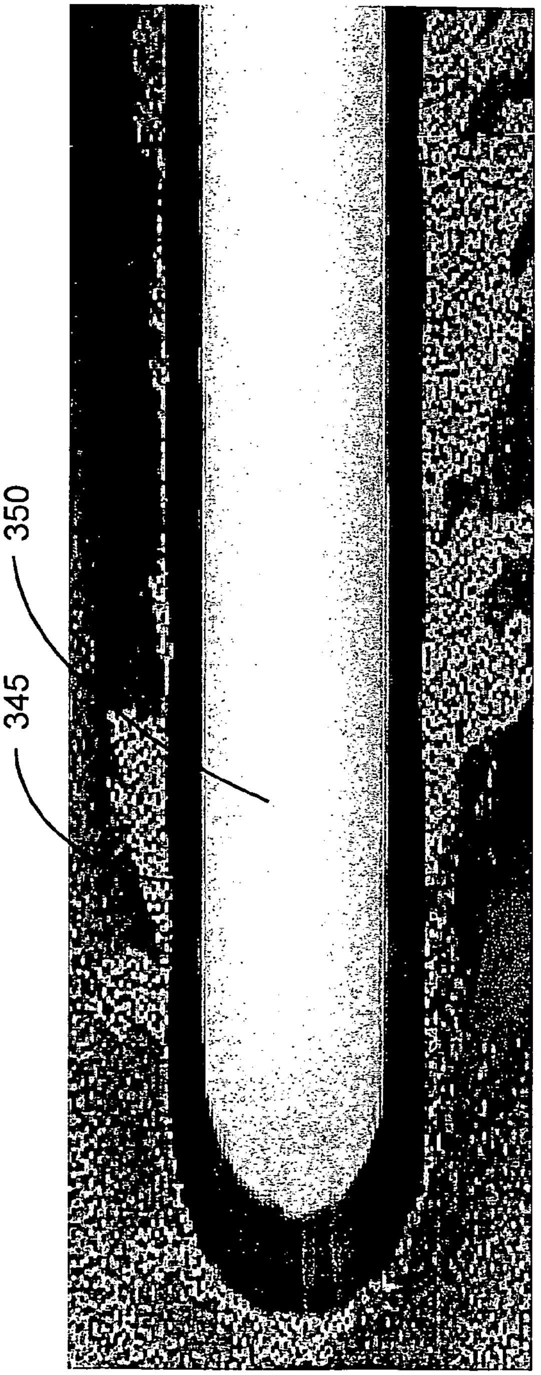

Referring to FIGS. 8A and 8B, perspective top and side views of a surface of a substrate with a feature formed therein that utilize an embodiment of improved laser micromachining techniques as described with respect to FIG. 5A, 5B, or 6 are illustrated. As can be seen from FIG. 8A, there are little if any protrusions along edge 345 of feature 350. As such, the possibility of debris or breakage that occludes feature 350 or can otherwise damage a device that includes the feature is greatly minimized. In addition, as can be seen from FIG. 8B, since edge 345 is countered or sloped, the likelihood of mechanical breakage or erosion is reduced.

Figure 9:
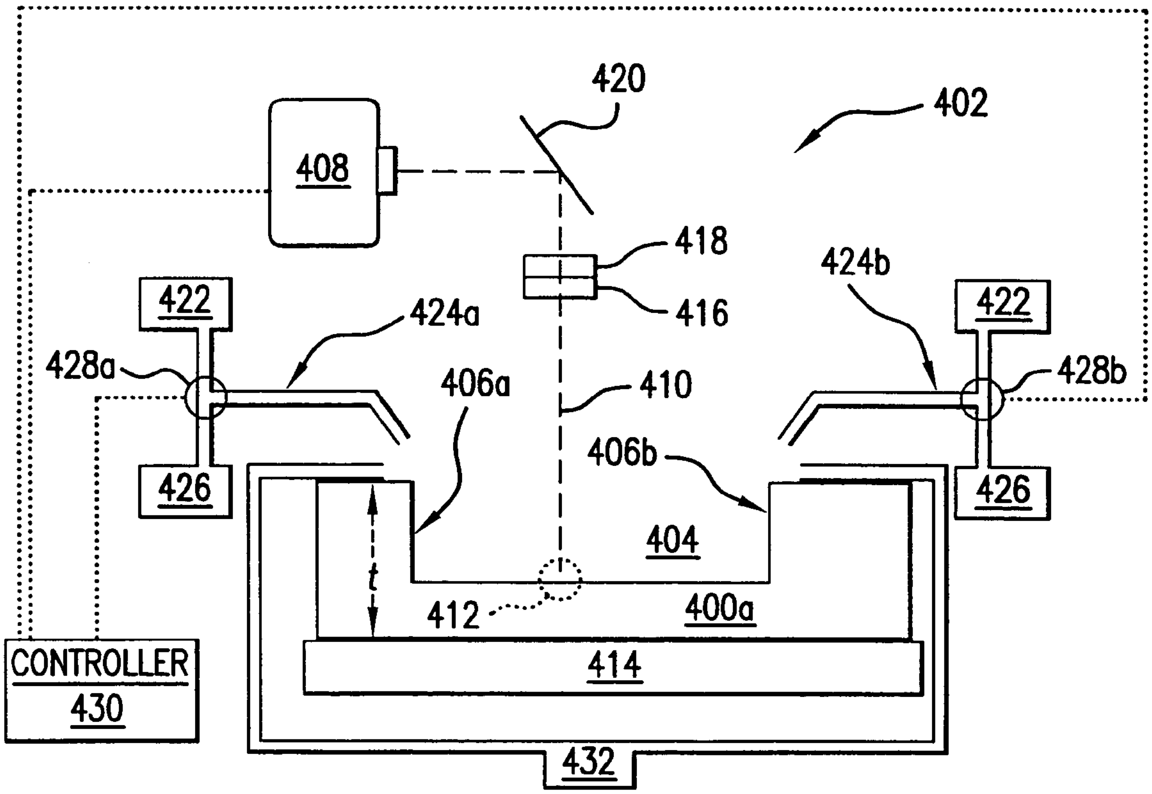
FIG. 9 illustrates a block diagram of an embodiment of an apparatus or laser machine capable of micromachining a substrate to form a feature.

FIG. 9 shows a cross-sectional diagrammatic representation of an exemplary apparatus or laser machine 402 capable of micromachining a substrate 400*a* to form a feature 404 therein. Laser machine 402 comprises a source of optical energy sufficient to remove substrate material to form feature 404. Feature 404 can have various configurations including, for example blind features and through features. In the illustrated embodiment, feature 404 comprises a blind feature extending into substrate 400*a*.

Laser machine 402 can have a laser source 408 capable of emitting a laser beam 410. The laser beam can contact, or otherwise be directed at, substrate 400*a*. Exemplary laser beams such as laser beam 410 can provide sufficient energy to energize substrate material at which the laser beam is directed. Energizing can comprise melting, vaporizing, exfoliating, phase exploding, ablating, reacting, and/or a combination thereof, among others processes. The substrate that laser beam 410 is directed at and the surrounding region containing energized substrate material is referred to in this document as a laser interaction region or zone 412. In some embodiments substrate 400*a* can be positioned on a fixture 414 for laser machining.

Various embodiments can utilize one or more lenses 416 to focus or to expand laser beam 410. In some of these embodiments, laser beam 410 can be focused in order to increase or decrease its energy density. In these embodiments the laser beam can be focused or defocused with one or more lenses 416 to achieve a desired geometry where the laser beam contacts the substrate 400*a*. In some of these embodiments a shape can have a diameter in a range from about 5 microns to more than 100 microns. In one embodiment the diameter is about 30 microns. Also laser beam 410 can be pointed directly from the laser source 408 to the substrate 400*a*, or pointed indirectly through the use of a galvanometer 418, and/or one or more mirror(s) 420.

In some embodiments laser machine 402 also can have one or more liquid supply structures for selectively supplying, from one or more nozzles at any given time, a liquid or gas 422 to the laser interaction region 412 and/or other portions of substrate 400*a*. This embodiment shows two supply structures 424*a*, 424*b*. Examples of suitable liquids will be discussed in more detail below. In some embodiments, supply structures 424*a*, 424*b* also may supply one or more gases 426 such as assist gases. Some of these embodiments may utilize dedicated gas supply structures while other embodiments such as the embodiment depicted in FIG. 9 can deliver gas 426 via liquid supply structures 424*a*, 424*b*. Examples of gas delivery and suitable gases will be discussed in more detail below.

One or more flow regulators can be utilized to regulate the flow of liquid and/or gas to the substrate. The present embodiment employs two flow regulators 428*a*, 428*b*.

A controller 430 can be utilized to control the function of laser source 408 and flow regulators 428*a*, 428*b* among other components. Controller 430 may include, either on a media or as firmware, a computer readable medium including instruction for operating a controller, which may be a computer, that controls laser source 408 and flow regulators 428*a*, 428*b* among other components to perform the methods and processes described herein, amongst other things.

Liquid 422 can be supplied at various rates during laser machining. For example, one suitable embodiment utilizing water as a suitable liquid delivers 0.1 gallons/hour to the substrate. Other suitable embodiments can supply water at rates that range from less than 0.05 gallons/hour to at least about 0.4 gallons/hour. Examples of gasses include, but are not limited to, 1,1,1,2 tetrafluroethane, other hyrdroflurocarbon gasses, nitrogen, and air. Embodiments of systems and methods of gas delivery are depicted and disclosed in co-pending U.S. patent application Ser. No. 10/437,377, entitled Laser Mircromaching System, which is incorporated by reference in its entirety.

Figure 10:
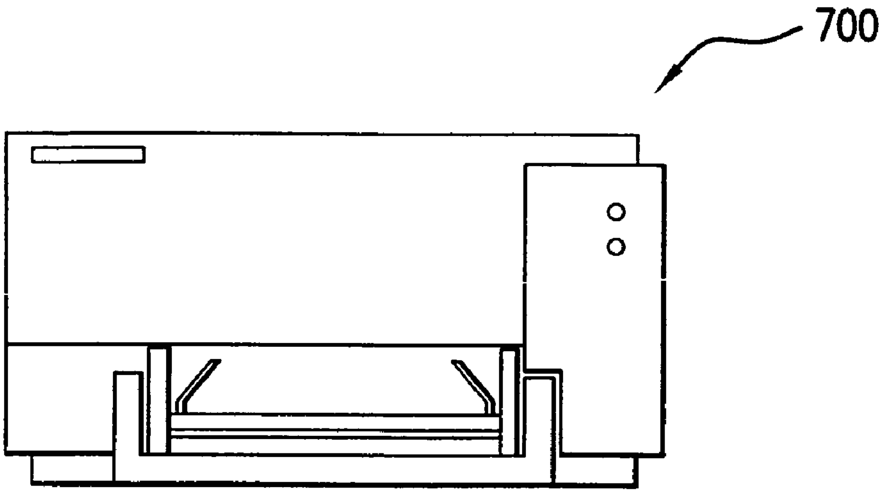
FIG. 10 illustrates a perspective view of an embodiment of a printer.
Figure 11:
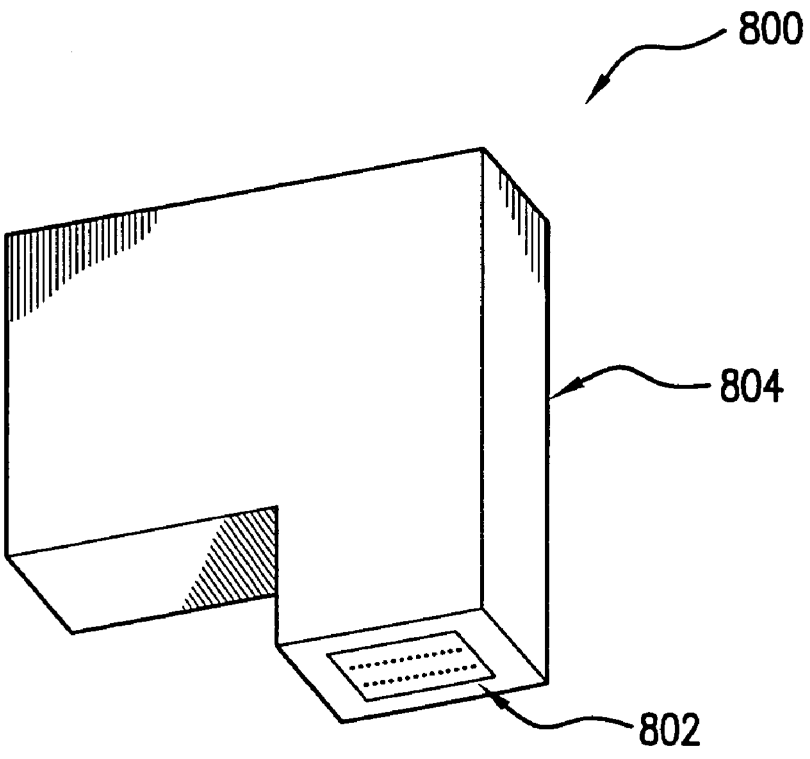
FIG. 11 illustrates a perspective view of an embodiment of a print cartridge.

FIGS. 10 and 11 illustrate examples of products which can be produced utilizing at least some of the described embodiments. FIG. 10 shows a diagrammatic representation of an exemplary printing device that can utilize an exemplary print cartridge. In this embodiment the printing device comprises a printer 700. The printer shown here is embodied in the form of an inkjet printer. The printer 700 can be capable of printing in black-and-white and/or in color. The term "printing device" refers to any type of printing device and/or image forming device that employs slotted substrate (s) to achieve at least a portion of its functionality. Examples of such printing devices can include, but are not limited to, printers, facsimile machines, and photocopiers. In this exemplary printing device the slotted substrates comprise a portion of a printhead which is incorporated into a print cartridge, an example of which is described below.

FIG. 11 shows a diagrammatic representation of an exemplary print cartridge 800 that can be utilized in an exemplary printing device. The print cartridge is comprised of a printhead 802 and a cartridge body 804 that supports the printhead. Though a single printhead 802 is employed on this print cartridge 800 other exemplary configurations may employ multiple printheads on a single cartridge.

Print cartridge 800 is configured to have a self-contained fluid or ink supply within cartridge body 804. Other print cartridge configurations alternatively or additionally may be configured to receive fluid from an external supply. Other exemplary configurations will be recognized by those of skill in the art.

While the embodiments herein utilize a UV laser to perform feature fabrication any laser or electromagnetic beam source that melts, vaporizes, exfoliates, phase explodes, ablates, reacts, and/or utilizes a combination thereof may be utilized in order to create features as described herein.

Although the inventive concepts have been described in language specific to structural features and methodological steps, it is to be understood that the appended claims are not limited to the specific features or steps described. Rather, the specific features and steps are disclosed as preferred forms of implementing the inventive concepts.

What is claimed is:

1. A laser machining process, comprising:

forming a first slot in a first surface of a substrate using a laser, the first slot having a depth that is smaller than a thickness of the substrate;

decreasing debris on a side wall of the first slot using a laser operated at an energy density that is smaller than an energy density used to form the first slot so as to fuse the debris on the side wall; and forming a second slot in a second surface of the substrate using a laser, the second slot being aligned with the first slot and extending through the substrate to the first slot to form a continuous path through the substrate.

2. The process of claim 1, wherein decreasing debris on a side wall of the first slot comprises melting the debris on the side wall to reduce the debris in size.

3. The process of claim 1, wherein decreasing debris on a side wall of the first slot comprises directing a laser beam on the side wall at an energy level at which light is absorbed into less than about 1 micron of the material forming the side wall.

4. The process of claim 1, wherein decreasing debris comprises decreasing debris using a laser beam that is directed at an angle that is different from an angle of a laser beam that is used to form the first slot.

5. The process of claim 1, further comprising forming a thin film stack on one of the first and second surfaces and patterning the thin film stack to provide access to one of the first and second surfaces to enable slot formation.

6. The process of claim 5, wherein forming a thin film stack comprises forming the thin film stack on the second surface of the substrate.

7. The process of claim 1, further comprising directing a gas toward the first surface while decreasing the debris on the side wall.

8. The process of claim 7, wherein the gas is selected from a group consisting of hydrofluorocarbon gasses, nitrogen, and air.

9. A laser machining system, comprising:

means for forming a first slot in a first surface of a substrate using a laser, the first slot having a depth that is smaller than a thickness of the substrate;

means for decreasing debris on the side wall of the first slot using a laser so as to fuse the debris on the side wall; and means for forming a second slot in a second surface of the substrate using a laser, the second slot being aligned with the first slot and extending through the substrate to the first slot to form a continuous path through the substrate.

10. A computer-readable medium storing instructions that control a laser to separately:

form a first slot in a first surface of a substrate, the first slot having a depth that is smaller than a thickness of the substrate;

decrease debris on a side wall of the first slot at an energy density that is smaller than an energy density used to form the first slot so as to fuse the debris on the side wall; and form a second slot in a second surface of the substrate, the second slot being aligned with the first slot and extending through the substrate to the first slot to form a continuous path through the substrate.

* * * * *